US012680575B2

(12) United States Patent (10) Patent No.: US 12,680,575 B2

Susumu et al. (45) Date of Patent: Jul. 14, 2026

(54) SLIDING MATERIAL

(71) Applicant: SANKYO OILLESS INDUSTRY, INC., Tokyo (JP)

(72) Inventors: Kohei Susumu, Tokyo (JP); Masahito Fujita, Tokyo (JP); Tomomitsu Watanabe, Tokyo (JP)

(73) Assignee: SANKYO OILLESS INDUSTRY, INC., Tokyo (JP)

( * ) Notice: Subject to any disclaimer, the term of this patent is extended or adjusted under 35 U.S.C. 154(b) by 0 days.

(21) Appl. No.: 18/842,545

(22) PCT Filed: Mar. 30, 2023

(86) PCT No.: PCT/JP2023/013186

§ 371 (c)(1),
(2) Date: Aug. 29, 2024

(87) PCT Pub. No.: WO2023/190873

PCT Pub. Date: Oct. 5, 2023

(65) Prior Publication Data

US 2025/0172175 A1 May 29, 2025

(30) Foreign Application Priority Data

Mar. 31, 2022 (JP) ................................. 2022-059915

(51) Int. Cl.
*F16C 33/12* (2006.01)
*C22C 9/04* (2006.01)

(52) U.S. Cl.
CPC .............. *F16C 33/121* (2013.01); *C22C 9/04* (2013.01)

(58) Field of Classification Search
None
See application file for complete search history.

(56) References Cited

U.S. PATENT DOCUMENTS

| | | | |
|---|---|---|---|
| 4,676,848 | A | 6/1987 | Ruchel et al. |
| 2012/0020600 | A1 | 1/2012 | Nishimura et al. |
| 2015/0159694 | A1 | 6/2015 | Hirayama et al. |

FOREIGN PATENT DOCUMENTS

| | | |
|---|---|---|
| JP | 60-114545 | 6/1985 |
| JP | 61-41738 | 2/1986 |
| JP | 1-252745 | 10/1989 |
| JP | 2010-159443 | 7/2010 |
| JP | 2010-265500 | 11/2010 |

OTHER PUBLICATIONS

International Search Report issued May 9, 2023 in corresponding International Application No. PCT/JP2023/013186.

*Primary Examiner* — Daniel J. Schleis

(74) *Attorney, Agent, or Firm* — Wenderoth, Lind & Ponack, L.L.P.

(57) ABSTRACT

A sliding material having improved slidability is provided. A sliding material, comprising a substrate comprising brass alloy and a Cr—Fe—Si-based intermetallic compound comprised in the substrate, wherein the nanoindentation hardness of regions wherein the Cr—Fe—Si-based intermetallic compound precipitated is 20 GPa or more and 28 GPa or less.

8 Claims, 6 Drawing Sheets

SLIDING MATERIAL

TECHNICAL FIELD

The present invention relates to a sliding material.

BACKGROUND ART

Sliding materials in which various intermetallic compounds (for example, silicides) are crystallized in a brass alloy matrix to improve the abrasion resistance are known.

Patent Literature 1 discloses an abrasion-resistant copper alloy, wherein the weight ratio to Fe and Mn is from 0.3 to 14 and the content is 1 to 15% by weight. Patent Literature 1 states that this ternary compound has higher abrasion resistance than conventional ones containing $Mn_5Si_3$ and/or $Fe_3Si$. Patent Literature 1 merely discloses that the addition of Cr has a dispersion effect.

Patent Literature 2 discloses manganese silicide in brass alloy. In Patent Literature 2, Cr, Zr, or compounds thereof act as a nucleating agent for the silicide deposit, and the addition thereof suppresses the eutectic fine deposition of silicides. That is, Patent Literature 2 discloses that the addition of Cr or Zr in a minute amount enables changing the precipitation morphology of manganese silicide.

Patent Literature 3 discloses additives such as Ti, Zr, V, and Cr, contributing to the micronization of the structure and the grain boundary strengthening as selective elements in a sintered material comprising a brass alloy containing Cu, Zn, Al, and Si as base metals. Since this sintered material utilizing surface pores is produced unlike ingot material without a step of completely melting the additive components to form alloy, even the sintered material containing the same components exhibits heterogeneous structures unlike the structure of ingot material.

Patent Literature 4 discloses a material wherein a brass matrix is limited to the β-phase, the amounts of Fe, Mn, and Si added are limited on the assumption that Fe—Mn—Si-based intermetallic compounds having compositions of $Mn_5Si_3$ and $Fe_3Si$, and the area rate of the compounds is 3 to 20%.

Patent Literature 5 discloses a substance, comprising Fe-based silicides such as a Fe—Cr—Si-based intermetallic compound, wherein the brass matrix is limited to the β-phase, but detail of the compound is not clarified.

CITATION LIST

Patent Literature

Patent Literature 1: Japanese Patent Laid-Open No. 60-114545

Patent Literature 2: Japanese Patent Laid-Open No. 61-41738

Patent Literature 3: Japanese Patent Laid-Open No. 1-252745

Patent Literature 4: Japanese Patent Laid-Open No. 2010-159443

Patent Literature 5: Japanese Patent Laid-Open No. 2010-265500

SUMMARY OF INVENTION

Technical Problem

As shown in prior art documents, as the frictional abrasive environment becomes severer, Mn—Si-based intermetallic compounds or improved Mn—Fe—Si-based intermetallic compounds have been increasingly utilized in brass matrices to contribute to improvement in abrasion resistance. Effects such as the precise chemical compositions, the precipitation morphologies, and the hardness of the intermetallic compounds on the friction and abrasion have not, however, been fully inspected.

The present invention has been completed to solve such a conventional problem, and an object thereof is to provide a sliding material having improved sliding characteristics.

Solution to Problem

The present invention is a sliding material, comprising a substrate comprising brass alloy and a Cr—Fe—Si-based intermetallic compound comprised in the substrate, wherein the nanoindentation hardness of regions wherein the Cr—Fe—Si-based intermetallic compound precipitated is 20 GPa or more and 28 GPa or less.

Advantageous Effects of Invention

The present invention enables providing a sliding material having improved sliding characteristics.

DESCRIPTION OF EMBODIMENTS

Hereinafter, a sliding material of an embodiment will be described in detail.

Figure 1:
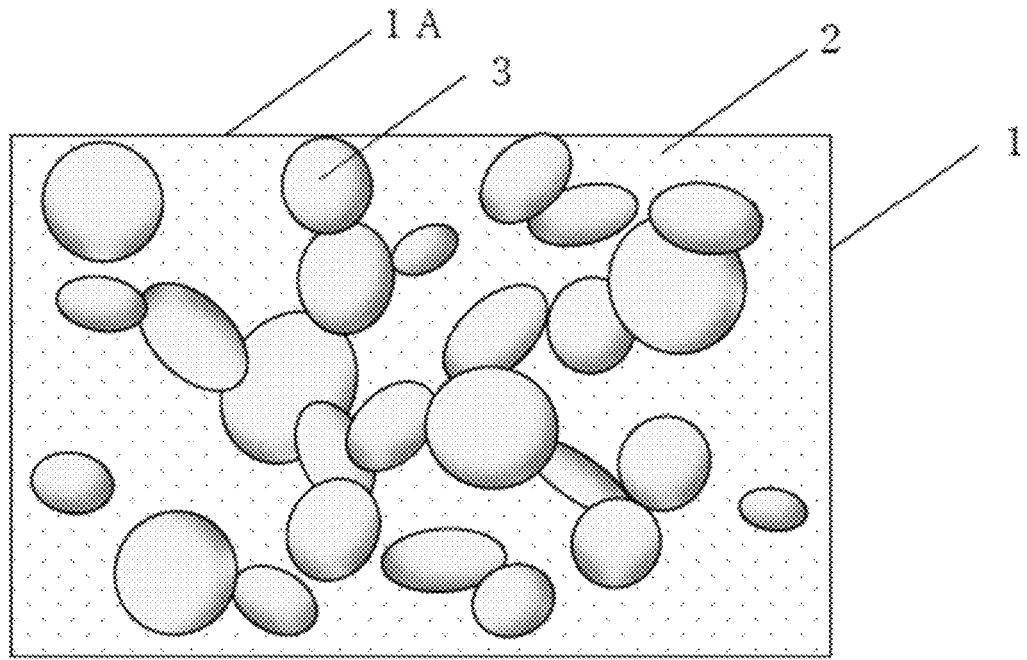
FIG. 1 is a sectional schematic diagram of a sliding material of an embodiment.

FIG. 1 is a schematic diagram showing a sectional structure of a sliding material 1 of the embodiment. FIG. 1 shows a three-dimensional structure of an intermetallic compound viewed from a cross section perpendicular to a sliding surface 1A. The sliding material 1 comprises a substrate (matrix) 2 and a Cr—Fe—Si-based intermetallic compound 3.

The substrate 2 comprises brass alloy. The substrate 2 imparts a shape and mechanical strength depending on its application to the sliding material 1.

The sliding material 1 of the embodiment contains (Cr, Fe)$_3$Si as a Cr—Fe—Si-based intermetallic compound 3, containing Cr as the main component. The Cr—Fe—Si-based intermetallic compound 3 representatively has a structure of $(Cr_{0.85}Fe_{0.15})_3Si$.

The Cr—Fe—Si-based intermetallic compound 3 has a composition of Cr Fe, and Si. The Cr—Fe—Si-based intermetallic compound 3 of the embodiment has a structure of (Cr,Fe)₃Si. Each Cr—Fe—Si-based intermetallic compound 3 has roundish outer shape with curved surfaces.

Numerous Cr—Fe—Si-based intermetallic compounds 3 contained in the substrate 2 are bound to each other to have a spatial structure in which the numerous Cr—Fe—Si-based intermetallic compounds 3 are connected. The sliding material of the present embodiment has regions with a nanoindentation hardness of 20 GPa or more and 28 GPa or less in which the Cr—Fe—Si-based intermetallic compound 3 precipitated. The definition and the measurement method of the hardness of the Cr—Fe—Si-based intermetallic compound 3 will be described below.

The binding ratio between the atoms in the Cr—Fe—Si-based intermetallic compound 3 was calculated from the composition in % by atom determined by point analysis using SEM-EDS to identify the compound and determine the binding rates of the atoms. For example, in the case of a simple manganese silicide, the binding ratio of Mn to Si of 5:3, the manganese silicide proves to be a compound with a chemical structure of $Mn_5Si_3$.

In the notation of this intermetallic compound, components are notated in descending order of content in the same way as in the notation of general alloy components, and for example, an intermetallic compound is notated as a Mn—Si-based intermetallic compound. The Cr—Fe—Si-based intermetallic compound 3 indicates that a compound comprises Cr as the main component, Fe, and Si.

The present inventors have confirmed that if this compound is ternarized like a Mn—Fe—Si-based intermetallic compound, the main structure remains $Mn_5Si_3$, and becomes $(Mn_x,Fe_y)$ (wherein x+y=1) formed by substituting some manganese atoms, and clarified the substitution ratio thereof. That is, the introduction of the measuring apparatus and an idea for determining the chemical structure enables knowing the precise chemical structure.

Intermetallic compounds were often evaluated exclusively based on the cross-sectional shape in the past. In the case of friction and abrasion, the three-dimensional precipitation morphology of the compounds however needs to be comprehended in response to the process of abrasion progress.

The present inventors have developed a corrosion method for dissolving the brass substrate 2 to leave only the Cr—Fe—Si-based intermetallic compound 3. The three-dimensional precipitation morphology of the Cr—Fe—Si-based intermetallic compound 3 can therefore be observed by SEM (secondary electron image).

The spatial structure of the Cr—Fe—Si-based intermetallic compound 3 can be comprehended by this method. The morphologies of the intermetallic compounds were compared to inspect the effects thereof on friction and abrasion.

The hardness of the Cr—Fe—Si-based intermetallic compound 3 can be measured with a nanoindenter.

The hardness is measured with a nanoindenter in accordance with "ISO 14577-1 Metallic materials—Instrumented indentation test for hardness and materials parameters-" and the annex thereof, "Annex A (normative) Materials parameters determined from the force/indentation depth data set". An apparatus, HYSITRONTI980, which is available from Bruker Japan, was used for measuring the hardness with a nanoindenter.

The conditions and the procedure for measuring the nanoindentation hardness will be shown below.

The conditions for measuring the nanoindentation hardness are as follows.

Test load: 800 μN
Loading: 1 s
Holding: 0.4 s
Unloading: 1 s
The ISO notates the measurement conditions as follows.

$$HIT = HIT8 \times 10^{-4} / 1 / 0.4 / 1 \ (\text{Notes: } ISO\ 14577 - 1 \ \text{Annex } A)$$

The measurement procedure and the method for determining the nanoindentation hardness of the Cr—Fe—Si-based intermetallic compound 3 are as follows.

Figure 2:
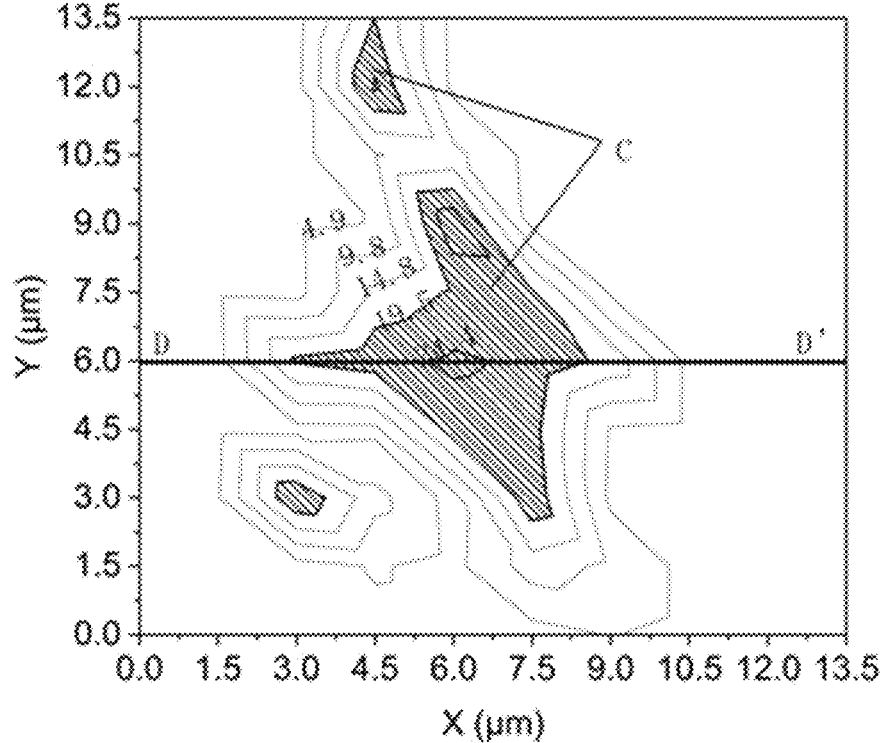
FIG. 2 is a contour map of the nanoindentation hardness.
Figure 3:
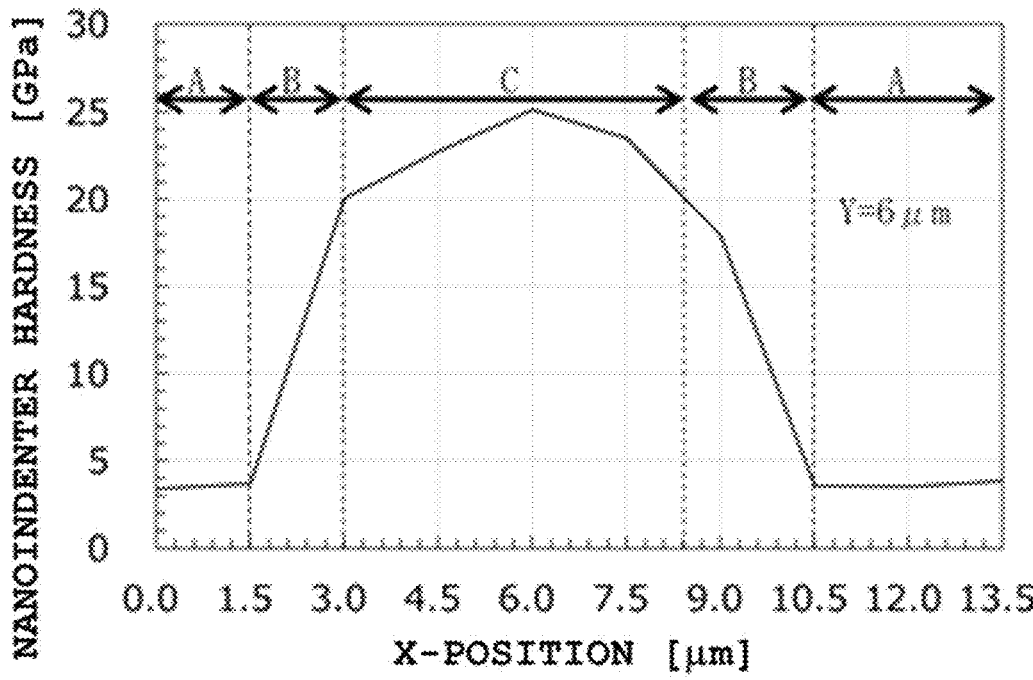
FIG. 3 is a sectional view of the nanoindentation hardness.

1. A sample surface to be measured is polished into a smooth surface with an ion milling apparatus.
2. Components in a visual field including the Cr—Fe—Si-based intermetallic compound 3 are confirmed with SEM/EDS. It is confirmed that a visual field through a camera of a nanoindentation measuring apparatus is the same as the visual field including the Cr—Fe—Si-based intermetallic compound 3. The visual field for nanoindentation measurement was determined thereby.
3. A grid with a grid interval of 1.5 μm is set in the visual field with a size of 13.5 μm×13.5 μm including the Cr—Fe—Si-based intermetallic compound 3. The nanoindentation hardness is sequentially measured on 100 grid points in total of the grid under the above-mentioned nanoindentation measurement conditions.
4. The points of the same nanoindentation hardness are connected by lines based on the above-mentioned measurement results to obtain a contour map. FIG. 2 is the contour map obtained by connecting the points of the same hardness by the lines. The cross section of the contours is then formed by cutting the contours along the line passing through the peak of the nanoindentation hardness of FIG. 2 and parallel to the x-axis (the line D-D' in FIG. 2). FIG. 3 is a cross-sectional view showing the hardness distribution obtained by forming the cross section of the contours.
5. In the hardness cross-sectional view of FIG. 3, the regions A show the regions of the substrate 2, the regions B show the boundary regions between the substrate 2 and the Cr—Fe—Si-based intermetallic compound 3, and the region C shows the region of the Cr—Fe—Si-based intermetallic compound 3.

The regions A of the substrate 2 have a nanoindentation hardness of around 4 GPa. The precipitation of the Cr—Fe—Si-based intermetallic compound 3 makes the boundary regions B between the substrate 2 and the Cr—Fe—Si-based intermetallic compound 3 harder than the substrate 2, and increases the hardness rapidly from the near vicinity of the substrate 2. In the region C of the Cr—Fe—Si-based intermetallic compound 3, the nanoindentation hardness in the central portion is comparatively flat, and is 19.5 GPa or more and 24.4 GPa or less in FIG. 2.

The nanoindentation hardness can be obtained as only discrete values by this measurement method. As a method for expressing the hardness of the Cr—Fe—Si-based intermetallic compound 3, the regions C in which the hardness was flat and high were therefore considered to be regions in which the Cr—Fe—Si-based intermetallic compound 3 precipitated. The nanoindentation hardness of the regions C was defined as the hardness of the Cr—Fe—Si-based intermetallic compound 3.

In the determination of the regions B, the boundary regions B are defined as portions satisfying the following condition:

$$|H_{n+1} - H_n| > 6.0 \text{ GPa}$$

wherein $H_n$ is defined as the nanoindentation hardness at a grid point, and $H_{n+1}$ is defined as the nanoindentation hardness at an adjacent grid point 1.5 μm separate therefrom. The boundary lines between the regions C and B shall be drawn in accordance with the contours.

The regions C, which are harder than the thus determined regions B, are considered to be regions in which the Cr—Fe—Si-based intermetallic compound 3 precipitated. In the case of the Cr—Fe—Si-based intermetallic compound 3, shown in FIG. 2, the region C has a nanoindentation hardness of 19.5 GPa or more and 24.4 GPa or less.

In the nanoindentation hardness measurement, multiple visual fields (for example, five visual fields) may be reflected. In the case, the range from the minimum value to the maximum value determined from the nanoindentation hardness of the visual fields 1 to 5 is defined as the nanoindentation hardness of the Cr—Fe—Si-based intermetallic compound 3. The procedure for measuring the nanoindentation hardness of other intermetallic compounds and the determination method are also performed in the same process.

The three-dimensional binding structure and the nanoindentation hardness of particles of the Cr—Fe—Si-based intermetallic compound 3 improve the slidability of the sliding material 1 of the embodiment.

The effect of the sliding material 1 of the embodiment was confirmed in comparison between the compositions, the structures, the spatial structures, or the nanoindentation hardness of the sliding material 1 of the embodiment and the sliding materials of Comparative Examples.

Figure 4:
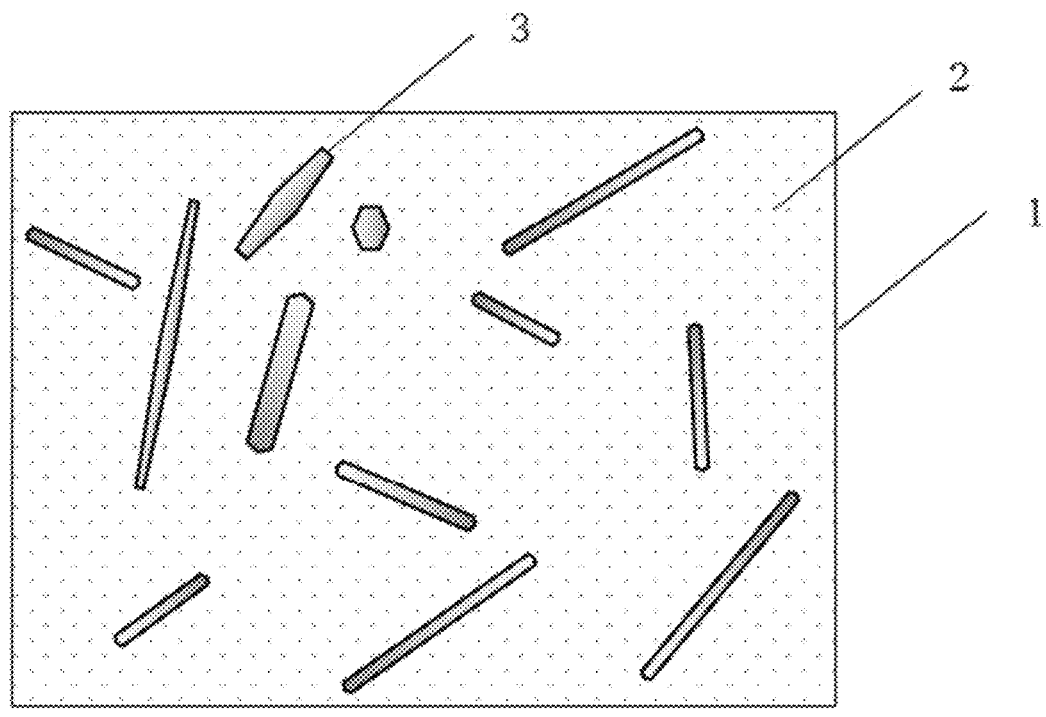
FIG. 4 is a sectional schematic diagram of a sliding material of Comparative Example.

FIG. 4 is a schematic diagram cross-sectional view of the three-dimensional shape of the sliding material of Comparative Example, containing a Mn—Si-based intermetallic compound. As shown in FIG. 4, the Mn—Si-based intermetallic compound has a chemical structure of $Mn_5Si_3$, preferential crystal growth directions, is separated into pieces, and has a shape to grow into hexagonal acicular crystals.

The Mn—Si-based intermetallic compound had a nanoindentation hardness of 16.8 GPa. Since stress is concentrated at the corners, this hexagonal acicular Mn-based silicide compound is lacking in toughness.

The Mn—Si-based intermetallic compound is highly crystalline to be easily broken, and is partially fractured on the frictional/abrasive surface, separated, and broken away to be foreign objects, which leads to a problem that the foreign objects roll on the sliding surface to damage the mating material at this time, and also results in seizure consequently. Especially in a sliding material to be used under severe conditions, the Mn—Si-based intermetallic compound is problematic.

Figure 5:
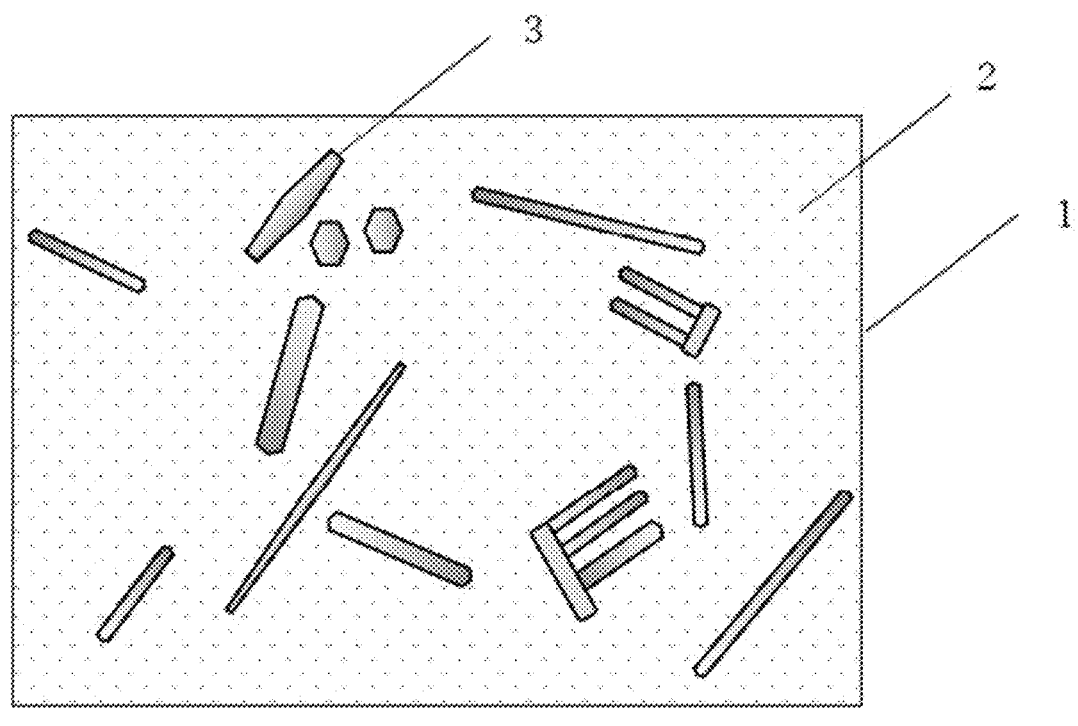
FIG. 5 is a sectional schematic diagram of a sliding material of Comparative Example.

FIG. 5 is a schematic diagram cross-sectional view of the three-dimensional shape of a sliding material containing the Mn—Fe—Si-based intermetallic compound. As shown in FIG. 5, the Mn—Fe—Si-based intermetallic compound has a chemical structure of $(Mn,Fe)_5Si_3$. The Mn—Fe—Si-based intermetallic compound has preferential crystal growth directions, is separated into pieces, and has a shape to grow into hexagonal acicular crystals like Mn—Si-based intermetallic compound.

The Mn—Fe—Si-based intermetallic compound has proved to be partially eutectic crystal into granular continuous structure. The Mn—Fe—Si-based intermetallic compound has a nanoindentation hardness of 18.5 GPa. The ternarization of the Mn—Fe—Si-based intermetallic compound increases the nanoindentation hardness slightly.

The sliding material 1 of the embodiment has a structure of $(Cr,Fe)_3Si$ in the substrate 2 of the cast brass-based alloy, a spatial structure that is roundish and composed of curved surfaces and in which the Cr—Fe—Si-based intermetallic compounds 3 are partially connected, and the regions C of the Cr—Fe—Si-based intermetallic compound 3 has a nanoindentation hardness of 20 GPa or more and 28 GPa or less. Since the sliding material 1 of the embodiment comprises the Cr—Fe—Si-based intermetallic compound 3, the sliding material 1 has high abrasion resistance and low frictional properties.

Intermetallic compounds comprising Cr, Fe, and Si include two compounds, namely $(Cr,Fe)_3Si$ (specifically $(Cr_{0.85}Fe_{0.15})_3Si$), which is the Cr—Fe—Si-based intermetallic compound 3 of the embodiment, containing Cr as the main component, and the Fe—Cr—Si-based intermetallic compound $(Fe,Cr)_3Si$ (specifically $(Fe_{0.85}Cr_{0.15})_3Si$), containing Fe as the main component. These two intermetallic compounds exhibit completely different morphologies.

Figure 6:
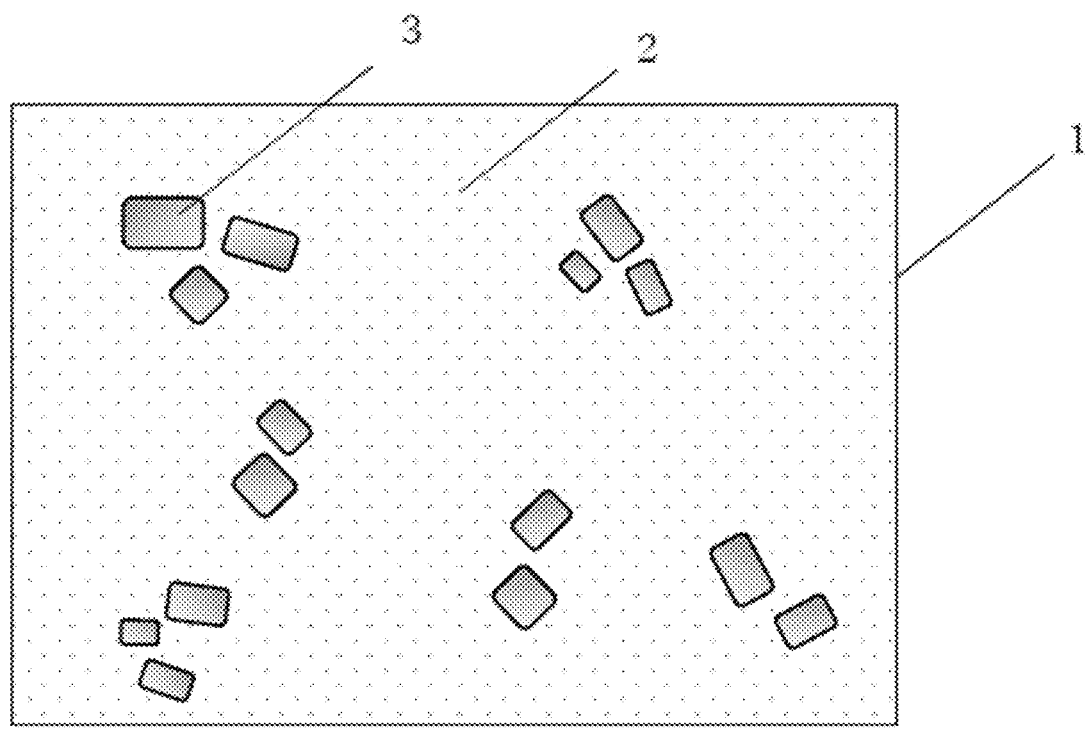
FIG. 6 is a sectional schematic diagram of a sliding material of Comparative Example.

FIG. 6 shows the morphology of the Fe—Cr—Si-based intermetallic compound. The Fe—Cr—Si-based intermetallic compound has a structure of $(Fe_{0.85}Cr_{0.15})_3Si$. The Fe—Cr—Si-based intermetallic compound is a compound in which $Cr_3Si$ compound are partially (85%) substituted with Fe atoms, which are transition metal atoms in the same way as Cr atoms.

Figure 7:
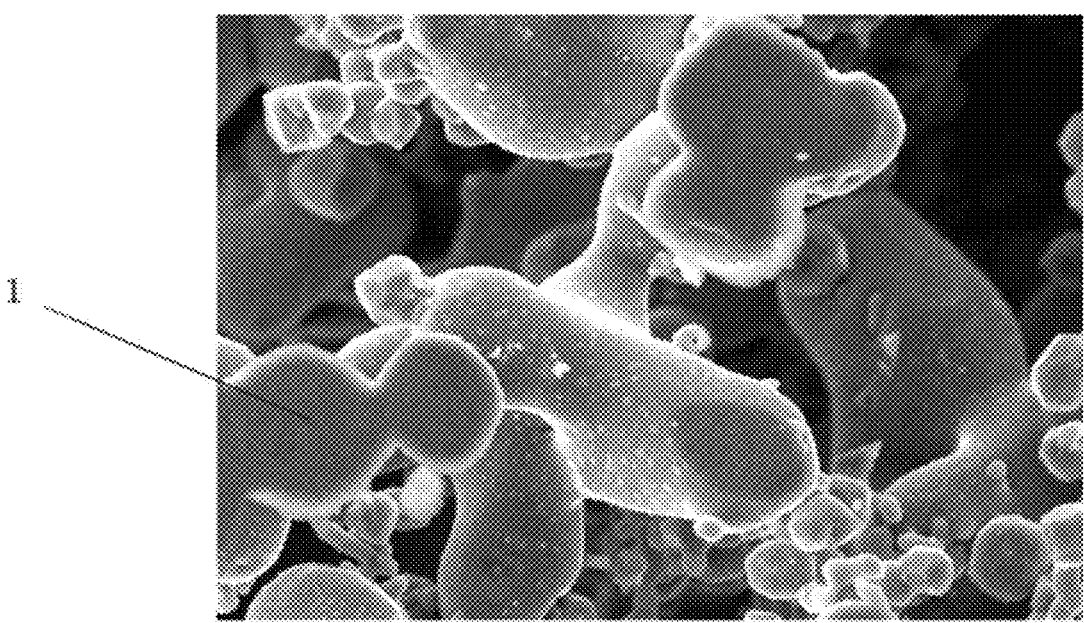
FIG. 7 is an SEM photograph of a Cr—Fe—Si-based intermetallic compound of the embodiment.

FIG. 7 is a SEM photograph showing the three-dimensional structure of the Cr—Fe—Si-based intermetallic compound 3. As shown in FIG. 7, the Cr—Fe—Si-based intermetallic compound 3 has a morphology that is roundish and composed of curved surfaces and three-dimensionally connected.

This three-dimensionally connected morphology is a morphology that Comparative Example, shown in FIG. 4, does not have, and leads to excellent characteristics in tribological performance. Meanwhile, the Fe—Cr—Si-based intermetallic compounds precipitated in a massive and finely dispersed state, and therefore less contribute to tribological characteristics.

The Cr—Fe—Si-based intermetallic compound 3 and the Fe—Cr—Si-based intermetallic compound tend to precipitate simultaneously. The present inventors have attempted the separative solidification of these two silicides for utilizing only the Cr—Fe—Si-based intermetallic compound. The control of solidification conditions enabled successfully solidifying the Cr—Fe—Si-based intermetallic compound 3 separately from the Fe—Cr—Si-based intermetallic compound. This enabled comprehending high frictional/abrasive characteristics specialized in the Cr—Fe—Si-based intermetallic compound to achieve the embodiment.

Although the Cr—Fe—Si-based intermetallic compound 3 and the Fe—Cr—Si-based intermetallic compound contain Cr, Fe, and Si as components in the same way, the compounds are completely different in morphology and hardness, so that the frictional/abrasive performances caused by the hard compounds are different. The embodiment is for utilizing, among these compounds, the Cr—Fe—Si-based intermetallic compound 3 containing Cr as the main component and having a spatial structure that is roundish and composed of curved surfaces and partially connected.

The cast brass-based alloy is evaluated for abrasion resistance and low frictional properties (low frictional coefficient properties) in accordance with the basic tribological expression (1).

$$\mu = \tau_0 / P_H \qquad (1)$$

wherein $\mu$: frictional coefficient, $\tau_0$: shearing force of lubricating substance, and $P_H$: hardness (load/area).

The frictional coefficient $\mu$ is directly proportional to the shearing force of the lubricating substance and inversely proportional to the hardness of the base metal. The hardness $P_H$ is a value obtained by dividing the load by the contact area. To reduce the frictional coefficient $\mu$, it is necessary to increase the hardness of the intermetallic compound serving as load points during the friction or to reduce the contact area of the intermetallic compound.

That is ideally, if the shape of the compound is made more similar to sphere to reduce the contact area, and the compound is hard, the frictional coefficient can be reduced.

Figure 8:
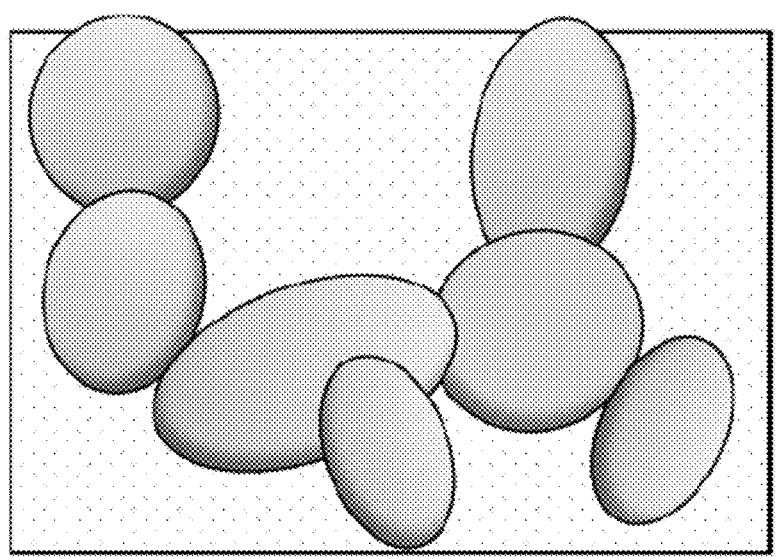
FIG. 8 is an enlarged schematic diagram of the sectional structure of a sliding material of the embodiment.

FIG. 8 shows the Cr—Fe—Si-based intermetallic compound 3 of the embodiment. As shown in FIG. 8, the Cr—Fe—Si-based intermetallic compound 3 of the embodiment is hard and has a compound morphology that is roundish and composed of curved surfaces and connected.

The Cr—Fe—Si-based intermetallic compound 3 of the embodiment is hard and has a shape of reduced frictional surface and increased radiating area therefore it can be considered that the compound enables reducing the frictional coefficient.

Figure 9:
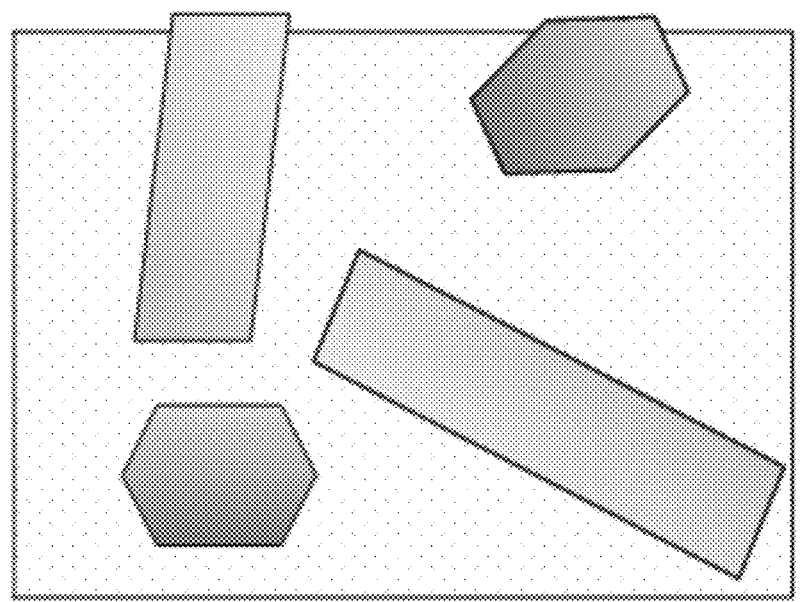
FIG. 9 is an enlarged schematic diagram of sectional structure of a sliding material of Comparative Example.

FIG. 9 shows the Mn—Fe—Si-based intermetallic compound of Comparative Example. As shown in FIG. 9, the Mn—Fe—Si-based intermetallic compounds of Comparative Example have polygonal shape, and are independent and unconnected.

In accordance with the above-mentioned basic tribological expression (1), the effect of the Cr—Fe—Si-based intermetallic compound 3 of the embodiment means that an increases in $P_H$ (hardness) reduces the frictional coefficient, the intervention of the lubricant reduces the frictional work, represented by $\mu \times load \times velocity$, and this enables reducing the generation of frictional heat, so that a low frictional effect is exhibited.

The abrasion loss (V) of a sliding material is represented by the expression (2).

$$V = Z(P / P_H) L \qquad (2)$$

The abrasion loss (V) is directly proportional to the abrasion coefficient Z, the load P, and the frictional distance L and inversely proportional to the hardness $P_H$. Accordingly, an increase in the hardness of a compound to precipitate in brass alloy, which is soft, enables reducing the abrasion loss.

The regions C of the Cr—Fe—Si-based intermetallic compound 3 of the embodiment have a nanoindentation hardness of 20 GPa to 28 GPa, and are in a structure having high abrasion resistance.

The intermetallic compound serves as load points during the friction to generate intense frictional heat. This frictional heat is dissipated through the interface between the intermetallic compound and the copper alloy matrix. Accordingly, the three-dimensional connection of the compound enables increasing the surface area of the whole intermetallic compound, and enhancing the heat dissipation efficiency rapidly. Such satisfactory heat dissipation efficiency during the friction enables preventing a rise in surface temperature and relieving severe frictional conditions.

For example, when the acicular $Mn_5Si_3$ compounds of Comparative Example, which precipitated alone, serve as load points to increase frictional heat, this may heat the intermetallic compound to high temperature, softens the compound/matrix interface, and makes the compound interface unstable to separate.

Since the Cr—Fe—Si-based intermetallic compounds 3 of the embodiment have large surface areas, and are connected, the heat exchanging area is meanwhile increased, which enables suitably diffusing frictional heat generated by the concentrated load. Thus, having the three-dimensional structure is an important factor in the case of friction and abrasion.

Figure 10:
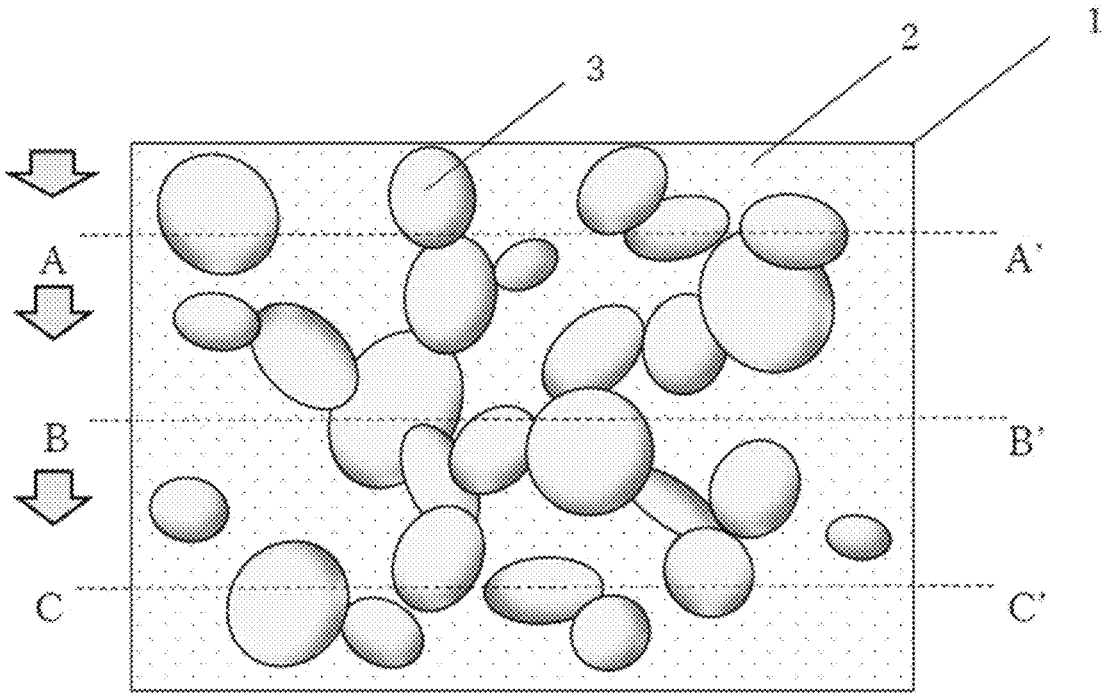
FIG. 10 is a figure describing the abrasion of the sliding material of the embodiment.

Having the structure that is three-dimensionally connected is particularly advantageous in abrasion resistance form the viewpoint of tribological performance. As shown in FIG. 10, even though the abrasion progresses from A-A' through B-B' to C-C', the Cr—Fe—Si-based intermetallic compound 3 always appears, so that the abrasion resistance and the low frictional properties are continuously maintained.

The shape and the continuity of the Cr—Fe—Si-based intermetallic compound 3 have an important meaning, the Cr—Fe—Si-based intermetallic compound 3 effectively functions as high-temperature and high-load bearing materials with respect to the application thereof. The continuity of the Cr—Fe—Si-based intermetallic compound 3 has an excellent structure for promoting the formation of optimal low frictional surfaces while the abrasion progresses.

EXAMPLES

Hereinafter, Examples of the present invention will be described. The present invention is not limited to the following Example.

Table 1 shows the compositions of intermetallic compounds contained in the sliding materials of Example and Comparative Examples. The sliding materials of Example and Comparative Examples contain the intermetallic compounds shown in Table 1 in a cast brass-based alloy matrix, which is Cu-26Zn-5Al.

Example 1 is a sliding material in which the Cr—Fe—Si-based intermetallic compound 3 precipitated in the substrate. Comparative Example 1 is a sliding material in which a Fe—Cr—Si-based intermetallic compound precipitated in the substrate. Comparative Example 2 is a sliding material in which $Mn_5Si_3$, a so-called Mn—Si-based intermetallic compound, precipitated in the substrate. Comparative Example 3 is a sliding material in which $(Mn,Fe)_5Si_3$, a so-called Mn—Fe—Si-based intermetallic compound, precipitated in the substrate.

Table 1 shows the chemical formulae of the intermetallic compounds, the precipitation morphologies of the intermetallic compounds (shapes and continuity (bonding or connection) of the intermetallic compounds), and the nanoindentation hardness (GPa) of regions in which the intermetallic compounds are present. The amount of Si added was 0.3%, and the amounts of Mn, Fe, Cr, and others added were determined depending on the compositions of the compounds to precipitate.

| 9 | | | | | 10 | |

TABLE 1

| | Chemical formula | Shape | Continuity | Hardness (GPa) |
|---|---|---|---|---|
| Example 1 | (Cr, Fe)₃Si | Roundish and composed of curved surfaces | Continuous | 19.5~27.9 |
| Comparative Example 1 | (Fe, Cr)₃Si | Fine polygonal shape | Discontinuous | 9.5~14.3 |
| Comparative Example 2 | Mn₅Si₃ | Hexagonal acicular shape | Discontinuous | 11.4~16.8 |
| Comparative Example 3 | (Mn, Fe)₅Si₃ | Hexagonal acicular shape and granular shape | Partially continuous | 12.2~18.5 |

Pure Cu base metal was first molten at a melting temperature of 1100° C. Zn was then added thereto in a predetermined amount to produce Cu—Zn alloy. Al was next added thereto and molten, and the temperature was raised to 1200° C. Mother alloys of elements required were added thereto and molten. All the alloys were molten and cast so as to contain the predetermined components and processed into a specimen shape.

In the case of the Cr—Fe—Si-based intermetallic compound 3 of Example 1, regions having a nanoindentation hardness of 19.5 GPa or more and 27.9 GPa or less in the regions C of the Cr—Fe—Si-based intermetallic compound 3 were observed. In the case of the Fe—Cr—Si-based intermetallic compound of Comparative Example 1, regions having a nanoindentation hardness of 9.5 GPa or more and 14.3 GPa or less were observed. In the case of the Mn—Si-based intermetallic compound of Comparative Example 2, regions having a nanoindentation hardness of 11.4 GPa or more and 16.8 GPa or less were observed. In the case of the Mn—Fe—Si-based intermetallic compound of Comparative Example 3, regions having a nanoindentation hardness of 12.2 GPa or more and 18.5 GPa or less were observed.

Thus, the Cr—Fe—Si-based intermetallic compound 3 of Example 1 is so hard that the hardness thereof influences the tribological performance greatly.

Figure 11:
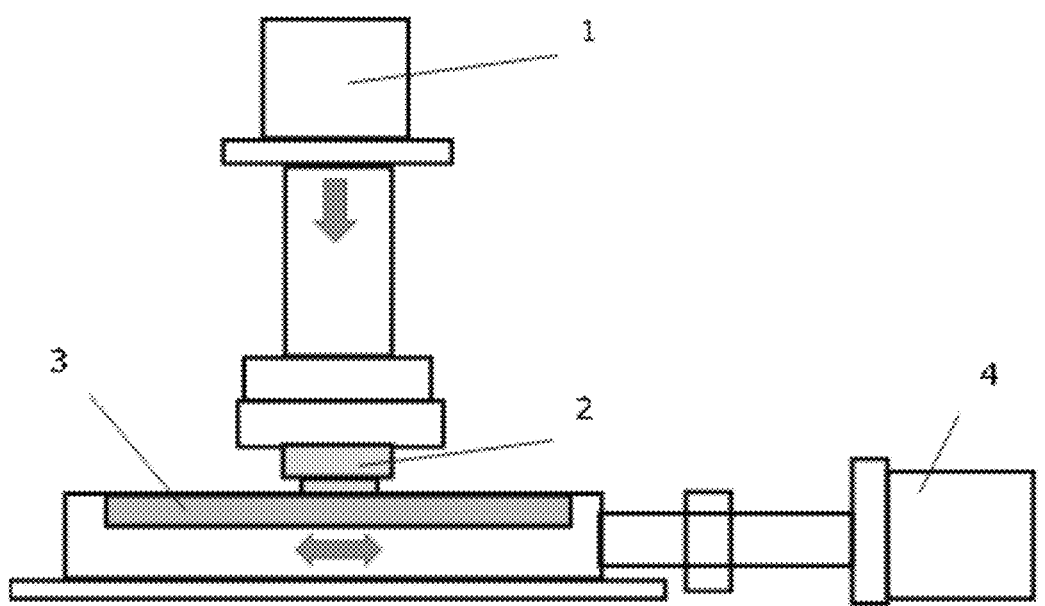
FIG. 11 is a figure showing a reciprocating sliding tester.

FIG. 11 shows the outline of a reciprocating sliding tester. This is a so-called pin-on-disk reciprocating sliding tester, and enables measuring the abrasion loss. In the figure, reference numeral 1 indicates a pressurizing device, reference numeral 2 indicates a material to be tested, and reference numeral 3 indicates a mating material. Reference numeral 4 is a motor for reciprocally sliding the mating material. The test conditions will be shown below.

Tester: Reciprocating dynamic load tester
Sliding velocity: 2 m/min
Reciprocating sliding distance: 150 mm
Total sliding distance: 500 m
Test temperature (bearing back surface temperature): 100° C.
Mating material: S45C surface-hardened material with a surface roughness, Ra 3.0
Lubricating oil: VG32
Frictional test load: Constant load of 30 MPa Table 2 shows the abrasion losses of the sliding materials of Example and Comparative Examples.

TABLE 2

| | Abrasion loss (μm) |
|---|---|
| Example 1 | 0.7 |
| Comparative Example 1 | 3.3 |
| Comparative Example 2 | 12.9 |
| Comparative Example 3 | 6.9 |

It can be seen that much higher abrasion resistance can be achieved in the sliding material of Example 1 than the sliding material of Comparative Example 1 or the sliding materials of Comparative Examples 2 and 3 that have been conventionally used.

Thus, it was proved that the excellent improvement in tribological performance can be achieved in the sliding material of Example by the precipitation of the Cr—Fe—Si-based intermetallic compound 3 that has high tribological performance in terms of the precipitation morphology and the nanoindenter hardness.

The sliding material of Example is usable in severe sliding environmental conditions such as a low-speed and high-load, high-speed and high-rotation, or corrosive environment, for example, in construction machine parts, car engine parts, transmission parts, hydraulic parts, or aircraft parts. The sliding material of Example is useful for applications requiring the abrasion resistance and low frictional properties, and enables providing a highly reliable sliding material.

Note that the structure, and the materials or the ratio therebetween of the composition of the sliding material of the embodiment are merely illustrations, and the present invention is not limited to these.

The invention claimed is:

1. A sliding material, comprising:
a substrate comprising brass alloy and
a Cr—Fe—Si-based intermetallic compound comprised in the substrate,
wherein the Cr—Fe—Si-based intermetallic compound has a nanoindentation hardness of 20 GPa or more and 28 GPa or less measured in accordance with ISO 14577-1.

2. The sliding material according to claim 1, wherein the Cr—Fe—Si-based intermetallic compound has a spatial structure in which the Cr—Fe—Si-based intermetallic compounds are connected.

3. The sliding material according to claim 1, wherein the Cr—Fe—Si-based intermetallic compound has a rounded shape composed of curved surfaces.

4. The sliding material according to claim 1, wherein the Cr—Fe—Si-based intermetallic compound has a chemical structure of (Cr,Fe)3Si.

5. The sliding material according to claim 2, wherein the Cr—Fe—Si-based intermetallic compound has a shape that is roundish and composed of curved surfaces.

6. The sliding material according to claim 2, wherein the Cr—Fe—Si-based intermetallic compound has a chemical structure of (Cr,Fe)3Si.

7. The sliding material according to claim 3, wherein the Cr—Fe—Si-based intermetallic compound has a chemical structure of (Cr,Fe)3Si.

8. The sliding material according to claim 5, wherein the Cr—Fe—Si-based intermetallic compound has a chemical structure of (Cr,Fe)3Si.

* * * * *